United States Patent [19]
Kremser et al.

[11] 3,859,238
[45] Jan. 7, 1975

[54] MIXTURES OF BITUMINOUS VACUUM RESIDUES AND/OR VACUUM GAS OILS AND AMORPHOUS POLYOLEFINS FOR THE MANUFACTURE OF SHAPED OBJECTS

[75] Inventors: Georg Kremser, Gelsenkirchen-Buer; Arnold Taube, Gladbeck-Zweckel, both of Germany

[73] Assignee: Veba-Chemie AG, Gelsenkirchen-Buer, Germany

[22] Filed: Oct. 22, 1971

[21] Appl. No.: 191,815

[30] Foreign Application Priority Data
Oct. 23, 1970  Germany............................ 2052043

[52] U.S. Cl. .................. 260/28.5 AS, 260/33.6 PQ
[51] Int. Cl. ....................... C08f 45/28, C08f 45/52
[58] Field of Search .............. 260/28.5 AS, 33.6 PQ

[56] References Cited
UNITED STATES PATENTS

| | | | |
|---|---|---|---|
| 2,947,697 | 8/1960 | Vierk | 260/28.5 AS |
| 3,132,027 | 5/1964 | Norton | 260/33.6 PQ |
| 3,336,252 | 8/1967 | Raichle | 260/28.5 AS |
| 3,445,394 | 5/1969 | Hunt | 260/33.6 PQ |
| 3,459,695 | 8/1969 | Hedge | 260/28.5 AS |
| 3,526,522 | 9/1970 | Seregely | 260/33.6 PQ |
| 3,615,803 | 10/1971 | Draper | 260/28.5 AS |
| 3,669,918 | 6/1972 | Raley | 260/28.5 AS |
| 3,673,141 | 6/1972 | Trieschmann | 260/28.5 AS |
| 3,716,510 | 2/1973 | Belak | 260/28.5 AS |

OTHER PUBLICATIONS
Modern Plastics Encyclopedia for 1968, Vol. 45, No. 1A, Sept. 1967, pages 474 and 475.

*Primary Examiner*—Morris Liebman
*Assistant Examiner*—P. R. Michl
*Attorney, Agent, or Firm*—Burgess, Dinklage & Sprung

[57] ABSTRACT

A mixture useful for the manufacture of shaped bodies and as a molding composition which comprises a bituminous crude oil vacuum residue having a density under 1,000 g/ml at 25°C., a viscosity of 10°–30°E. at 90°C., a drip point according to Ubbelohde of 30°–50°C., a Cleveland flame point of above 250°C. or a bituminous gas oil having a density of less than 0.980 g/ml and a viscosity of 5°–50°E. at 50°C. and an amorphous polyolefin, the combined content of the bituminous product and polyolefin being between 5 and 95% by weight based on the weight of the mixture.

2 Claims, No Drawings

3,859,238

MIXTURES OF BITUMINOUS VACUUM RESIDUES AND/OR VACUUM GAS OILS AND AMORPHOUS POLYOLEFINS FOR THE MANUFACTURE OF SHAPED OBJECTS

BACKGROUND OF THE INVENTION

1. Field of the Invention

This invention is directed to molding compounds comprising a vacuum gas oil or vacuum residue of specified properties and at least one amorphous polyolefin. The molding compound is characterized by superior thermal properties and ductility.

2. Discussion of the Prior Art

It is known that molding compounds prepared from bituminous vacuum residues or from the bitumen from certain crude oils according to DIN 1995 soften even at ambient temperatures or slightly elevated temperatures, and that under mechanical stress they tend to deform undesirably even at relatively low temperatures. Building components formed from pure types of bitumen are unable long to withstand bending or tensile stresses.

It is also known that bitumen can be improved in a number of its characteristics through the use of polyvinyl compounds, particularly copolymers of vinyl compounds.

Polyolefins, especially polyethylene, have also been added to bitumen. These additives, however, have the disadvantage that they can be distributed through the bitumen only with difficulty and imperfectly by the use of the apparatus commonly used in the working of bitumen, and separation phenomena may appear which appreciably impair their effectiveness.

Mixtures of bitumen and ethylene copolymers (formed of ethylene, vinyl esters and/or copolymerizable acrylic and/or methacrylic compounds) are also known. For example, mixtures of 50 weight parts of bitumen having a DIN penetration of 45 1/10 mm and a ring and ball softening point of about 60°C. and 50 weight parts of a copolymer of ethylene and vinyl esters display improved characteristics in comparison with pure bitumen, but have the disadvantage, among others, that they cannot be fabricated from the molten state without pressure and require the use of revolving screw feeders or other such apparatus.

It is furthermore in the prior art to add amorphous polypropylene to standard or oxidation bitumen. Such mixtures have a higher ring and ball softening point than pure bitumen, but the cold strength is not improved and the ductility is appreciably reduced. Such mixtures also display incompatibilities which result in separation and impaired workability.

SUMMARY OF THE INVENTION

Broadly, this invention contemplates a mixture useful for the manufacture of shaped bodies and as a molding composition which comprises a bituminous crude oil vacuum residue having a density under 1,000 g/ml at 25°C., a viscosity of 10°–30°E. at 90°C., a drip point according to Ubbelohde of 30°–50°C., a Cleveland flame point of above 250°C. or a bituminous gas oil having a density of less than 0.980 g/ml and a viscosity of 5°–50°E. at 50°C. and an amorphous polyolefin, the combined content of the bituminous product and polyolefin being between 5 and 95% by weight based on the weight of the mixture.

We have now surprisingly found that the above-described disadvantages of the prior-art bitumen-and-plastic mixtures can be avoided by using mixtures composed of a certain bituminous vacuum residue and/or vacuum gas-oils and an amorphous polyolefin.

DESCRIPTION OF PREFERRED EMBODIMENTS

The subject of the invention is accordingly mixtures for the manufacture of shaped objects, consisting of certain bituminous vacuum residues and/or vacuum gas-oils of crude oils and amorphous polyolefins, characterized in that the vacuum residue has a density of less than 1,000 g/ml at 25°C., a viscosity of 10°–30°E. at 90°C., an Ubbelohde drip point of 30°–50°C., preferably 36°–38°C., and a Cleveland flash point above 250°C., the vacuum gas-oil has a density of less than 0.980 g/ml and a viscosity of 5°–50°E. at 50°C., and the content of bituminous product and amorphous polyolefins is between 5 and 95% by weight.

The preferred amorphous polyolefin content is between 30 and 80% by weight.

The mixtures may contain known mineral and fibrous additives if desired.

In comparison with pure bituminous molding compounds, such molding compounds have a ring and ball softening point that is 30° to 40°C. higher, and a substantially higher penetration index even though they contain no oxidation bitumen. Also improved are adhesion to metal, concrete and minerals, elongation at rupture, low-temperature stability, resistance to deformation at elevated temperatures, corrosion resistance, permeability to water vapor, and oil sweating tendency.

In comparison with mixtures of bitumen with polyvinyl compounds the molding compounds in accordance with the invention have the advantage that especially their ductility is higher and therefore they are more widely useful. In comparison with mixtures of bitumen and ethylene copolymers the molding compounds of the invention have the advantage that their ring and ball softening point is 30° to 40°C. higher, and the penetration index is likewise higher (+9 to +11 as compared with +4 to +5). Consequently the molding compounds of the invention have substantially better thermal stability and can be fabricated more easily, without pressure, at temperatures slightly above the melting temperature. Also improved is stability under stress at elevated temperature, permeability to water vapor and the tendency of the oily components of the bituminous ingredients to sweat out.

The molding compounds can be prepared in the usual manner by mixing the bitumen component with the amorphous polyolefin in stirring apparatus. The bituminous component, which can be made in a vacuum apparatus can be obtained either directly as a vacuum residue or in the form of a mixture of a soft vacuum residue and a suitably heavy vacuum gas-oil (flux oil). To prepare molding compounds of various consistencies, the viscosity or the quantity ratio of the two bituminous components, as the case may be, can be varied on the one hand, and on the other hand the percentage of the amorphous polyolefin in the completed mixture can be varied. The synthetic resid component necessary for the molding compounds of the invention can be obtained by the low-pressure polymerization process with the use of organo-metallic compounds and compounds of the Fourth to Eighth Sub-Group as catalysts. The amorphous polyolefins that can be used in accordance with the invention may be homopolymers of propylene, butene-1, 4-methylpentene-1, and copolymers of these monomers and/or other α-olefins. Exceptions are copolymers of propylene with ethylene which contain less than 50% propylene.

The great technical advantage of these new molding compounds consists particularly in the fact that they can be applied or spread in any desired thickness onto objects, directly from the melt, and it may be advantageous to apply a primer (e.g., a sizing compound) to the surfaces to be coated. The molding compounds can easily be made into sheet materials and boards, and they can be used for the lining of containers and for the coating of pipes. They are outstandingly suited for use as sealing compounds for floors, and for sealing cracks and fissures in buildings or road pavements. The new molding compounds can be used to special advantage in making vapor varriers, insulating membranes, roofing papers and anticorrosive wrappings for pipes. In general, the new compounds are suitable for the protection of any object against corrosion by immersing it into the molten compounds.

Conventional mineral fillers, such as rock dust, ground shale and electrical filter ash, can be added to the molding compounds to further improve the mechanical strength and elasticity. Mineral fillers containing more than 75% by weight of a grain size under 0.09 mm are effective in quantities of 10 to 90% by weight, preferably 20 to 30% by weight.

The new molding compounds can also be mixed to special advantage with an additive of the group of fillers, sands, gravels and crushed rock having grain sizes up to 35 mm, and they can be used for the making of highly wear-resistant road surfacings, high and low curbstones, and foundation slabs. In the components made from these compounds, the deformability of the road building compositions in the stress range from about 0° to 80°C. is substantially improved in comparison to the asphalt mixtures of the prior art. Additional advantages of these new molding compounds over pure bitumen in this field of application are the accommodation of a higher percentage of binding agent, the absence of excessive oiliness in the road surface, and finally the longer useful life of the road surfacing made with these compounds.

If the molding compounds of the invention are made to contain fibrous fillers such as asbestos, rock wool, glass fibers, wool felt, jute and/or synthetic fibers, in addition to mineral fillers in some cases, molding compounds and structures of especially great mechanical stability are obtained.

The following examples will illustrate the advantages of the new molding compounds.

The following examples are intended to further explain the mixtures of the invention without limiting the invention thereto. The parts specified are parts by weight. The data on penetration and ring and ball softening point correspond to DIN 1995. The drip point was determined by the Ubbelohde method in accordance with DIN 51,801.

EXAMPLE 1

30 parts of bituminous vacuum [distillation] residue with an Ubbelohde drip point of about 37°C. according to DIN 51,801, an extrapolated penetration of about 5000 and a Fraass crack point of less than −40°C., are mixed with 70 parts of an amorphous polypropylene having a viscosity of 21,000 cP at 170°C. (at 3.27 sec$^{-1}$ shear gradient), a DIN penetration of 25 1/10 mm at 25°C., and a ring and ball softening point of 151°C., in a conventional mixing apparatus at 180°–200°C., to achieve a uniform dispersion. In spite of its very high ring and ball softening point of 148°C. and a DIN penetration of 36 1/10 mm, this composition has a Fraass crack point of −24°C. In comparision to pure bitumen, the bending performance of a sheet 3 mm thick made from this material and tested on a 20 mm mandrel is substantially better. Whereas under these conditions a sheet 3 mm thick made of standard or oxidation bitumen cracks at −2° to −5°C., a sheet of the above-described composition does not form cracks until the temperature drops below −22°C. Mechanical stability at 80°C. is also so greatly improved that no dripping or running of the molding compounds occurs even after 200 hours in a vertical test arrangement.

Molding compounds of this kind can be used to special advantage for the making of vapor varriers and insulating membranes, roofing papers, and also anticorrosive wrappers and other anticorrosive products.

EXAMPLE 2

40 parts of the bituminous component described in Example 1 are mixed together with 60 parts of an amorphous polypropylene as in Example 1 at 180°–200°C. in, for example, a commonly available planetary mixer, and a homogeneous molding compound is obtained which has more resilient properties and even more desirable low-temperature stability in a thicker layer than in Example 1 (bending test: no cracking until temperature drops below −25°C.). These molding compounds, with or without filler, are particularly advantageous when a high resistance to cracking at low temperatures combined with good plasticity at normal temperatures is desired. These improved characteristics are brought about by the increased DIN penetration of 45 1/10 mm combined with a high ring and ball softening point of 145°C. (penetration index = 9.8). Molding compounds of this kind are generally advantageous for use in winter under severe conditions.

EXAMPLE 3

If 50 parts of a bituminous vacuum residue having an Ubbelohde drip point of about 37°C. according to DIN 51,801 are mixed with 50 parts of an amorphous polypropylene having a viscosity of 2,300 cP at 170°C. and a shear gradient of 3.27 sec$^{-1}$ in a conventional mixer at 180°–200°C., molding compounds are obtained which, depending on the mixture ratio, have important advantages as binding agents in comparison with prior-art bituminous binding agents according to DIN 1995. A mixture of this kind in a 1:1 ratio has a ring and ball softening point of 144°C., a DIN penetration of 78 1/10 mm at 25°C. and a Fraass cracking point of −26°C. Such a binding agent has the characteristics of a greatly expanded bitumen that has been treated with the oxygen of the air. Such molding compounds or binding agents are outstandingly suited, either by themselves or in mixtures with standard bitumens in accordance with DIN 1995, for the preparation of road construction materials. They increase the deformation resistance of road materials under heavy traffic, permit a higher and more advantageous proportion of binding agent, and thereby make it possible, in combination with special mineral mixtures in some cases, to improve the wear resistance of pavement surfacings.

EXAMPLE 4

30 parts of bituminous vacuum residue with an Ubbelohde drip point of about 37°C. according to DIN 51,801 are mixed with and uniformly dispersed into 70 parts of an amorphous propenebutene-1 copolymer having a butene-1 content of 20 mole percent and a viscosity of 11,700 cP at 170°C., a shear gradient of 3.27 sec$^{-1}$, a DIN penetration of 22 1/10 mm and a ring and ball softening point of 138°C., in a conventional mixer at 180° to 200°C. This compound has a ring and ball softening point of 136°C., a DIN penetration of 34 1/10 mm and a Fraass crack point of −24°C. It has good characteristics similar to those of the compound from Example 1 and can be used for the same purposes.

EXAMPLE 5

40 parts of bituminous vacuum residue with an Ubbelohde drip point of about 37°C. according to DIN 51,801 are mixed in a conventional mixer at 180°-200°C. with 60 parts of an amorphous polybutene-1 having a viscosity of 42,000 cP at 170°C., shear gradient 3.27 sec$^{-1}$, a DIN penetration of 22 1/10 mm and a ring and ball softening point of 126°C. This compound has a ring and ball softening point of 121°C., a DIN penetration of 40 1/10 mm and a Fraass crack point of −26°C. Like the compound from Example 2, it has a high breaking strength at low temperatures and can be used like the compound from Example 2.

EXAMPLE 6

20 parts of heavy vacuum gas-oil having a viscosity of 25°E. at 50°C., a density of 0.940 at 25°C. and a Cleveland flame point of 262°C. according to ASTM D 92-66, are mixed and homogenized in a conventional mixer at 180°-200°C. with 80 parts of an amorphous polypropylene having a viscosity of 21,000 cP at 170°C. (shear gradient 3.27 sec$^{-1}$), a DIN penetration of 25 1/10 mm and a ring and ball softening point of 151°C. This compound has a ring and ball softening point of 123°C., a penetration of 58 1/10 mm and a Fraass crack point below −33°C. Such a compound withstands extreme stresses at low winter temperatures and can be used to advantage wherever insulation or anticorrosive compounds in the form of rolls, wrappings or other such forms, for example, have to be subjected to working operations involving bending, folding or impact stresses at extremely low temperatures (under −30°C.).

The definition of the viscosity according to Engler (E) corresponds to DIN 51,550; the apparatus used for the definition corresponds to DIN 51,560. Engler degrees give the relation of the outrunning time of 200 ml of the liquide to test at the testing temperature in respect to the outrunning time of 200 ml water at 20°C. The kinematic viscosity in centistockes multiplicated with the factor 0,132 gives the viscosity in degrees Engler.

We claim:

1. A pressure-less workable composition of matter useful for the manufacture of shaped bodies and as a molding composition which consists essentially of a bituminous crude oil vacuum residue having a density under 1.000 g/ml at 25°C, a viscosity of 10°-30°E. at 90°C, a drip point according to Ubbelohde of 30°-50°C, a Cleveland flame point of above 250°C and a amorphous polyolefin which is a copolymer of propene and butene-1, the amount of amorphous polyolefin being between 30 and 80% by weight based upon the combined content of the bituminous product and the amorphous polyolefin.

2. A pressure-less workable composition of matter useful for the manufacture of shaped bodies and as a molding composition which consists essentially of a bituminous crude oil vacuum residue having a density under 1.000 g/ml at 25°C, a viscosity of 10°-30°E. at 90°C, a drip point according to Ubbelohde of 30°-50°C, a Cleveland flame point of above 250°C and amorphous polybutene-1 in an amount between 30 and 80% by weight based upon the combined content of the bituminous product and the amorphous polybutene-1.

* * * * *